Patented Apr. 22, 1924.

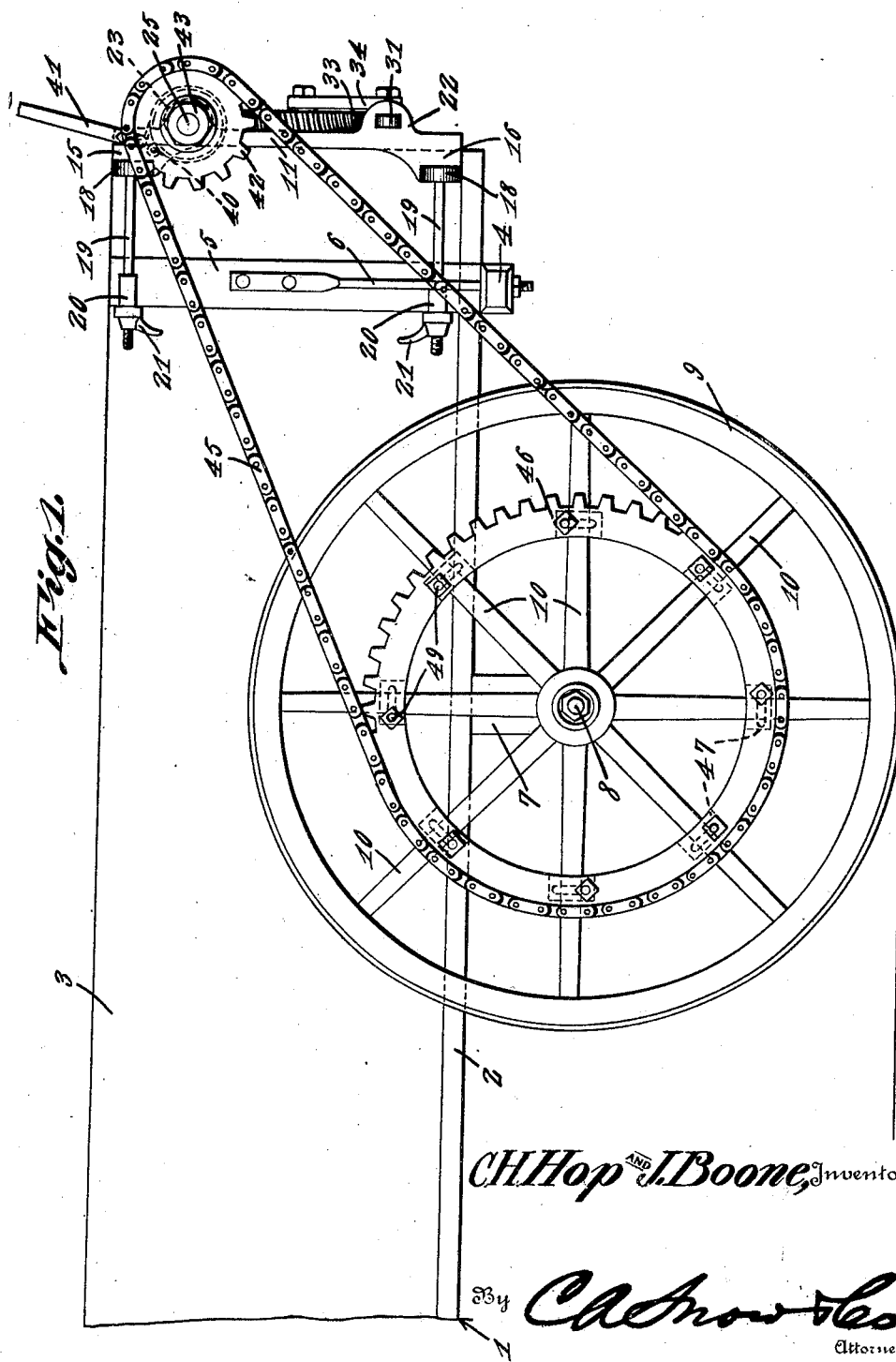

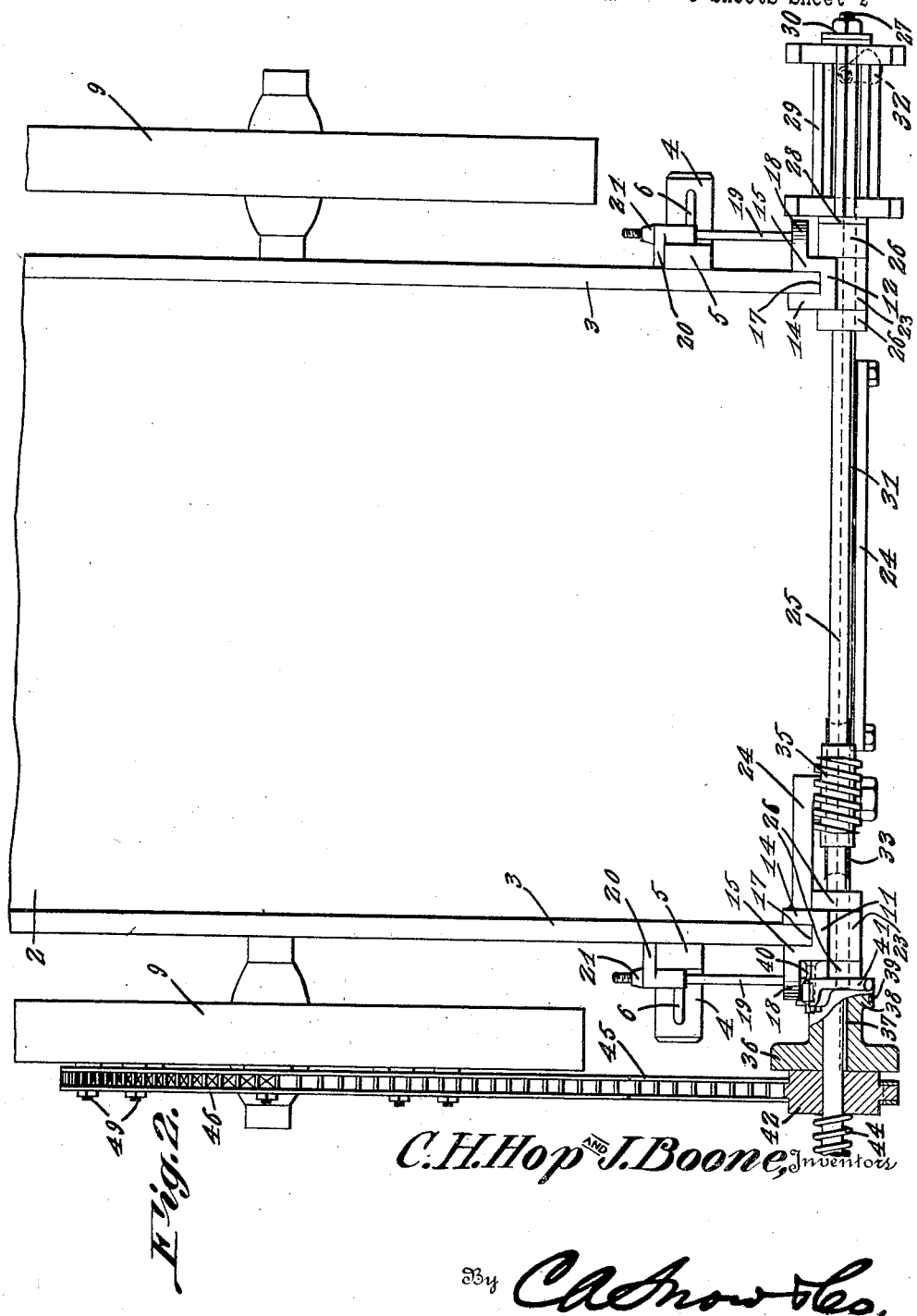

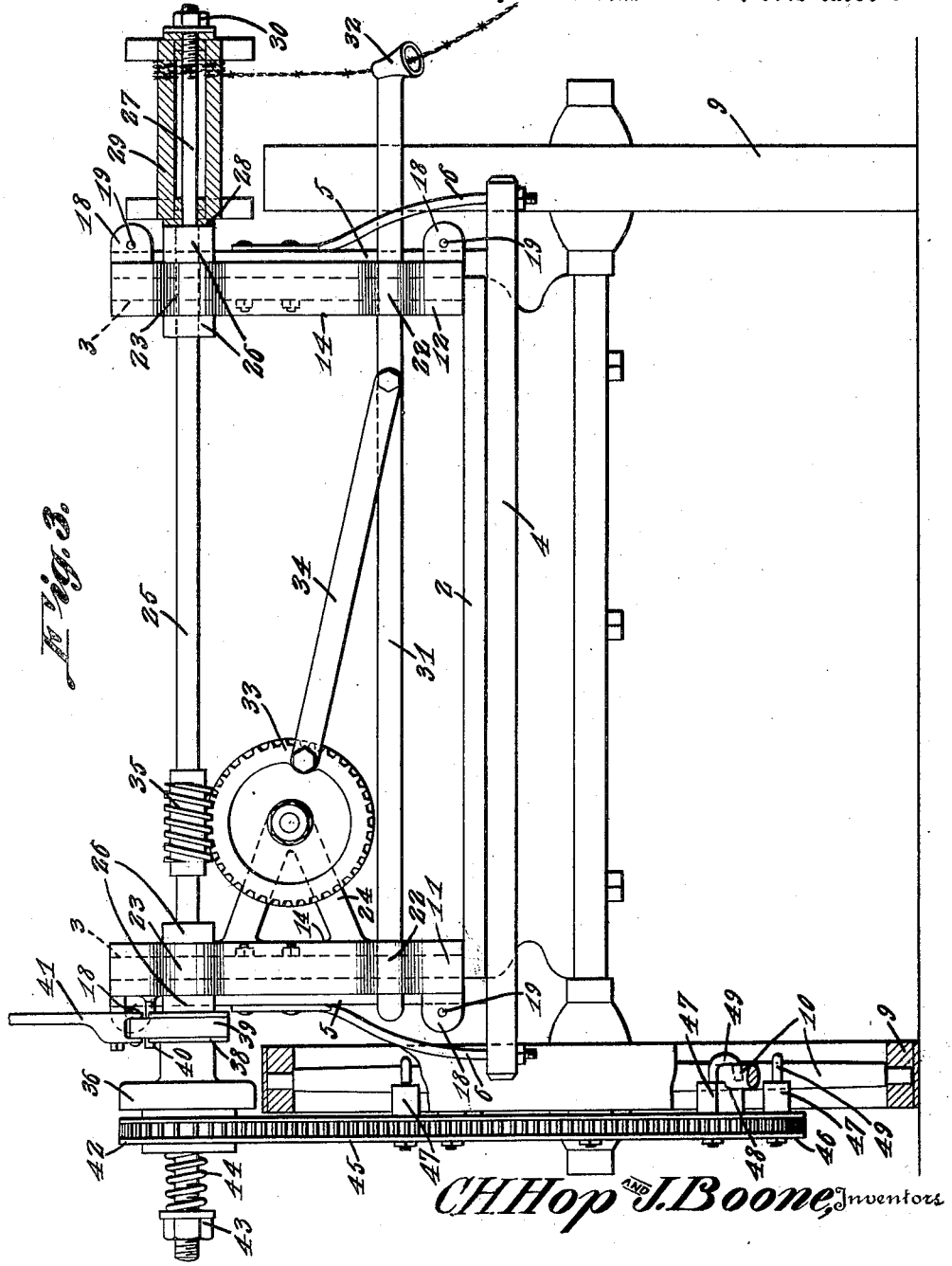

1,491,305

UNITED STATES PATENT OFFICE.

CHRIS H. HOP AND JOHN BOONE, OF MAURICE, IOWA.

DEVICE TO WIND AND UNWIND WIRE.

Application filed September 21, 1922. Serial No. 589,613.

*To all whom it may concern:*

Be it known that we, CHRIS H. HOP and JOHN BOONE, citizens of the United States, residing at Maurice, in the county of Sioux and State of Iowa, have invented a new and useful Device to Wind and Unwind Wire, of which the following is a specification.

This invention aims to provide novel means for mounting a reel for rotation on a wagon, and for imparting rotation to the reel, from the wagon wheel, for the purpose of winding up fence wire and the like, novel means being provided for actuating a guide which distributes the wire on the reel as the wire is wound upon the reel.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a part of a wagon whereunto the device forming the subject matter of this application has been applied; Figure 2 is a top plan, parts appearing in section; Figure 3 is an end elevation, parts being shown in section.

The device forming the subject matter of this application may be mounted in various ways, on vehicles of widely different sorts. In order to show one means for putting the invention into practice, there is delineated in the drawings a wagon body 1 including a bottom 2 and side boards 3, a cross bar 4 extending beneath the bottom 2 and carrying side stakes 5 cooperating with the side boards 3, the side stakes being sustained from the cross bar by braces 6. The bolster of the wagon is marked by the numeral 7 and carries an axle 8 whereon ground wheels 9 are journaled, the spokes of the wheels being denoted by the numeral 10.

The device comprises a frame, embodying posts 11 and 12, each post having an inner flange 14 and being provided with an upper outer arm 15 and a lower outer arm 16, the flange 14 and the arms 15 and 16 defining longitudinal seats 17 in the posts 11 and 12, the seats being adapted to receive the rear edges of the side boards 3 of the wagon. The arms 15 and 16 have outwardly extended flanges 18, carrying rods or attaching members 19, which are extended forwardly. On each rod or attaching member 19 an angular clip 20 is mounted for sliding movement, the clips being adapted to engage the side stakes 5, under the action of lever nuts 21 which are threaded on the rods 19, the parts 21, 20 and 19 serving to hold the posts 11 and 12 on the rear edges of the side boards 3. The posts 11 and 12 are provided adjacent to their lower ends with rearwardly extended guides 22, and are supplied adjacent to their upper ends with rearwardly extended bearings 23. A bracket 24 projects inwardly from the post 11.

A shaft 25 is journaled for rotation in the bearings 23 of the posts 11 and 12, longitudinal movement of the shaft 25 being prevented by collars 26, mounted on the shaft and cooperating with the bearings 23 and the posts 11 and 12. The shaft 25 has a reduced end 27 whereon a reel 29 is mounted, a washer 28 being interposed between the reel 29 and the adjacent collar 26. The reel 29 is held on the end 27 of the shaft 25 for rotation with the shaft, by means of a nut 30 and washers, the nut being threaded on the outer extremity of the part 27 of the shaft 25 and binding the washers against the outer end of the reel 29.

A traveller 31, in the form of a bar is mounted for straight line reciprocation in the parts 22 of the posts 11 and 12 and is provided at one end with a funnel-shaped guide 32, the guide 32 being downwardly and outwardly inclined, and being located below the reel 29. A pinion 33 is mounted to rotate on the bracket 24 of the post 11. A pitman 34 is connected eccentrically to the pinion 33 and is pivoted to the traveller 31 intermediate the ends thereof. The shaft 25 is supplied with a worm 35 meshing into the pinion 33.

An abutment 36 is keyed to the shaft 25 and is located adjacent to that end of the shaft which is remote from the reel 29, the key for the abutment being marked by the numeral 37. The abutment 36 includes a brake disk 38, around which extends a strap 39, one end of the strap being secured at 40 to the post 11, and the other end of the strap being secured to a lever 41 fulcrumed on the post 11. A driving member 42, which may be in the form of a sprocket wheel, is mounted on the end of the shaft 25 for rotation under circumstances to be pointed out hereinafter. The nut or adjusting member 43 is carried by the end of the shaft 25. A compression spring 44 surrounds the end of the shaft 25 and is located between the adjusting member 43 and the sprocket wheel 42. The spring 44 crowds the sprocket wheel 42 against the abutment 26 with sufficient force so that, under ordinary circumstances, when rotation is imparted to the sprocket wheel 42 rotation will be imparted likewise to the shaft 25. Under an unusual strain, however, the sprocket wheel 42 can rotate on the shaft 25, in frictional engagement with the abutment 36. The sprocket wheel 42 is engaged by a sprocket chain 45 passed about a sprocket wheel 46 having lugs 47 provided with seats 48 adapted to receive the spokes 10 of one of the ground wheels 9 of the wagon, the sprocket wheel 46 being held on the spokes by hook bolts 49 or the like, mounted in the lugs 47.

In practical operation, when the ground wheels 9 are rotated, one of the ground wheels will rotate the sprocket wheel 46. The sprocket wheel 46 transmits motion to the sprocket wheel 42, through the instrumentality of the sprocket chain 45, the sprocket wheel rotating the shaft 25, through the instrumentality of the abutment 46, because the sprocket wheel 42 is pressed against the abutment 36 by the spring 44. When the shaft 25 is rotated, rotation will be imparted to the reel 29, the wire being coiled upon the reel, the wire moving through the funnel-shaped guide 32 on the traveller 31. When the shaft 25 is rotated, the worm 35 will rotate the pinion 33 and, through the instrumentality of the pinion 34, longitudinal sliding movement will be imparted to the traveller 31, the guide 32 being caused to move inwardly and outwardly, transversely of the line of advance of the vehicle, the wire being led fairly and evenly on the reel 29 as the wire is wound upon the reel. The operator may, at any time, check or stop the rotation of the shaft 25 by applying the brake mechanism 39—41.

Should the wire become taut, for any reason whilst the wire is being wound on the reel 29, the wire will not be broken, since a slip connection is afforded between the sprocket wheel 42 and the abutment 36. The worm 35, the pinion 33 and the pitman 34 constitute a simple but efficient means for reciprocating the roving guide embodying the traveller 31 and the part 32.

What is claimed is:—

1. A device of the class described comprising spaced posts having seats for the reception of the side boards of a wagon; means for securing the posts on the side boards of a wagon; a shaft mounted to rotate in the posts; and means for rotating the shaft from the ground wheel of the wagon.

2. A device of the class described, comprising a frame; means for mounting the frame on a vehicle; a shaft journaled in the frame; means for rotating the shaft from the ground wheel of the vehicle, said means including a slip connection; a brake under the control of an operator and cooperating with the shaft; a guide mounted to reciprocate on the frame; and mechanism for operating the guide from the shaft.

In testimony that we claim the foregoing as our own, we have hereto affixed our signatures in the presence of two witnesses.

CHRIS H. HOP.
JOHN BOONE.

Witnesses:
P. N. Vos,
GERRIT ROZENBOOM.